US012807325B2

(12) United States Patent
Czapla et al.

(10) Patent No.: US 12,807,325 B2
(45) Date of Patent: *Nov. 24, 2026

(54) INSTALLATION FOR AN AIRCRAFT, HAVING A STRUCTURE DELIMITING A VOLUME WITH A HIGH POINT AND AN ELEMENT CONTAINING DIHYDROGEN

(71) Applicants: Airbus SAS, Blagnac (FR); Airbus Operations SAS, Toulouse (FR)

(72) Inventors: Lionel Czapla, Toulouse (FR); Jonathan Landolt, Blagnac (FR)

(73) Assignees: Airbus SAS, Blagnac (FR); Airbus Operations SAS, Toulouse (FR)

(*) Notice: Subject to any disclaimer, the term of this patent is extended or adjusted under 35 U.S.C. 154(b) by 0 days.

This patent is subject to a terminal disclaimer.

(21) Appl. No.: 19/295,945

(22) Filed: Aug. 11, 2025

(65) Prior Publication Data

US 2026/0048851 A1 Feb. 19, 2026

(30) Foreign Application Priority Data

Aug. 14, 2024 (FR) ................................ FR2408910

(51) Int. Cl.
*B64D 37/32* (2006.01)

(52) U.S. Cl.
CPC .................................. *B64D 37/32* (2013.01)

(58) Field of Classification Search
CPC ..................................................... B64D 37/32
See application file for complete search history.

(56) References Cited

U.S. PATENT DOCUMENTS

| | | | | |
|---|---|---|---|---|
| 2014/0255733 | A1* | 9/2014 | Masset | H01M 8/04022 429/408 |
| 2016/0159492 | A1* | 6/2016 | Filangi, Jr. | B60L 50/72 244/58 |
| 2023/0077242 | A1* | 3/2023 | Emerson | B64D 37/32 |
| 2023/0170504 | A1 | 6/2023 | Hancock et al. | |

FOREIGN PATENT DOCUMENTS

| | | |
|---|---|---|
| JP | 6772467 B2 | 10/2020 |

OTHER PUBLICATIONS

French Search Report for corresponding French Patent Application No. 2408910 dated Feb. 5, 2025.

* cited by examiner

*Primary Examiner* — Tye William Abell
(74) *Attorney, Agent, or Firm* — Greer, Burns & Crain, Ltd.

(57) ABSTRACT

An installation for an aircraft having a structural assembly of the aircraft delimiting a volume with a high point, a container in which dihydrogen is present and which is arranged in the volume, and a catalyzer to catalyze an oxidation reaction of the dihydrogen with ambient air. The catalyzer is fastened in the volume at the high point.

6 Claims, 3 Drawing Sheets

INSTALLATION FOR AN AIRCRAFT, HAVING A STRUCTURE DELIMITING A VOLUME WITH A HIGH POINT AND AN ELEMENT CONTAINING DIHYDROGEN

CROSS-REFERENCES TO RELATED APPLICATIONS

This application claims the benefit of French Patent Application Number FR2408910 filed on Aug. 14, 2024, the entire disclosure of which is incorporated herein by way of reference.

FIELD OF THE INVENTION

The invention relates to the field of aircraft in which a circuit of pipes, pumps, tanks, etc. for dihydrogen is arranged. The invention relates more particularly to an installation having a structure that delimits a volume in which is disposed an element containing dihydrogen and where, in the volume, there is arranged a material that catalyzes an oxidation reaction of the dihydrogen with the ambient air in order to oxidize dihydrogen. The invention also relates to an aircraft having at least one such installation.

BACKGROUND OF THE INVENTION

As is known, dihydrogen may constitute an alternative to petroleum in the propulsion of vehicles, in particular of aircraft. To this end, an aircraft has a dihydrogen tank that supplies a fuel cell so as to generate electricity that powers an electric motor, or, directly, an engine that consumes the dihydrogen.

The aircraft then has a network of pipes, pumps and other elements through which the dihydrogen passes. For safety reasons and in order to limit the risk of dihydrogen leaks, it is known to use double-skinned pipes, for example.

Although such an arrangement makes it possible to have a sufficient level of safety, it may be useful to provide another arrangement that limits the risk of concentrations of dihydrogen in the aircraft.

SUMMARY OF THE INVENTION

An object of the present invention is to propose an installation for an aircraft, having a structure that delimits a volume in which is disposed an element containing dihydrogen and where, in the volume, there is arranged a material that catalyzes an oxidation reaction of the dihydrogen with the ambient air in order to oxidize dihydrogen.

For this purpose, there is proposed an installation for an aircraft, said installation having:

- a structural assembly of the aircraft delimiting a volume with a high point,
- a container in which dihydrogen is present and which is arranged in the volume, and
- a catalyzer intended to catalyze an oxidation reaction of the dihydrogen with the ambient air, wherein the catalyzer is fastened in the volume at the high point.

With such an arrangement, the dihydrogen is consumed, and this prevents the excessive concentration thereof.

Advantageously, the volume has a low point and the installation has, at the low point, a drying-out channel arranged through a wall of the structural assembly to evacuate liquid water from the volume.

Advantageously, the installation has, through a wall of the structural assembly, an evacuation channel arranged at the high point behind the catalyzer with respect to the container.

Advantageously, the installation has, through a wall of the structural assembly, an introduction channel arranged to introduce air into the volume.

Advantageously, the installation has an additional catalyzer intended to catalyze an oxidation reaction of the dihydrogen with the ambient air, wherein the additional catalyzer is fastened in the volume between the introduction channel and the container.

Advantageously, for the or each catalyzer, the installation has a seal disposed around the associated channel, between the catalyzer and the wall of the structural assembly where said channel is arranged.

Advantageously, the structural assembly is a portion of a wing of the aircraft.

Advantageously, the installation has, for the or each catalyzer, a temperature sensor arranged to measure the temperature of said catalyzer.

The invention also proposes an aircraft having at least one installation according to one of the preceding variants.

BRIEF DESCRIPTION OF THE DRAWINGS

The above-mentioned features of the invention, along with others, will become more clearly apparent upon reading the following description of at least one exemplary embodiment, said description being given with reference to the appended drawings, in which.

DETAILED DESCRIPTION OF THE PREFERRED EMBODIMENTS

Figure 1:
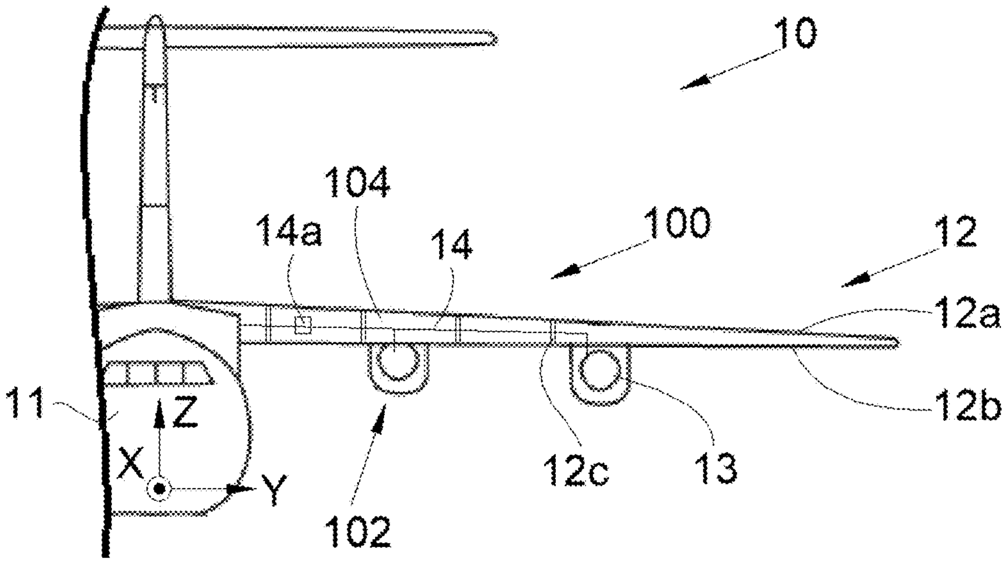
FIG. 1 is a front view in cross section of an aircraft in which an installation according to the invention is implemented.

FIG. 1 shows an aircraft 10 that has a fuselage 11 and, on either side of the fuselage 11, a wing 12. The aircraft 10 has engines 13 that are supplied with dihydrogen via pipes 14 from a dihydrogen tank that is disposed, for example, in the fuselage 11.

The dihydrogen is used to carry out combustion in the engine 13 or to supply a fuel cell present in the vicinity of the motor 13 that is then supplied with electricity from this fuel cell.

In order to allow dihydrogen to be provided along the wing 12 and as far as each of the engines 13, the aircraft 10 has, generally speaking, pipes 14, pumps 14*a* and any other necessary device. These elements are hereinafter referred to as "containers 106" and dihydrogen is present in each of them.

The aircraft 10 has a structure divided into structural assembly 102. "Structural assembly 102" refers to any set of elements of the structure of the aircraft 10 that together delimit a volume 104 that is more or less fluidtight with respect to the dihydrogen and which, in any case, as a result of its design delimits a volume 104 in which the dihydrogen can accumulate.

A structural assembly 102 may, for example, be a section of the wing 12 that has a portion of the suction-side wall 12*a*, a portion of the pressure-side wall 12*b* and crossmember walls 12*c* that are fastened between the suction-side wall 12*a* and the pressure-side wall 12*b*. Thus, according to one particular embodiment, the volume 104 is between the suction-side wall 12*a*, the pressure-side wall 12*b* and two successive crossmember walls 12*c*.

A structural assembly may, for example, be a section of the fuselage 11 that has an inner skin, an outer skin and beams that are fastened between the inner skin and the outer skin. The volume 104 is then between the inner skin, the outer skin and two successive beams.

Figure 2:
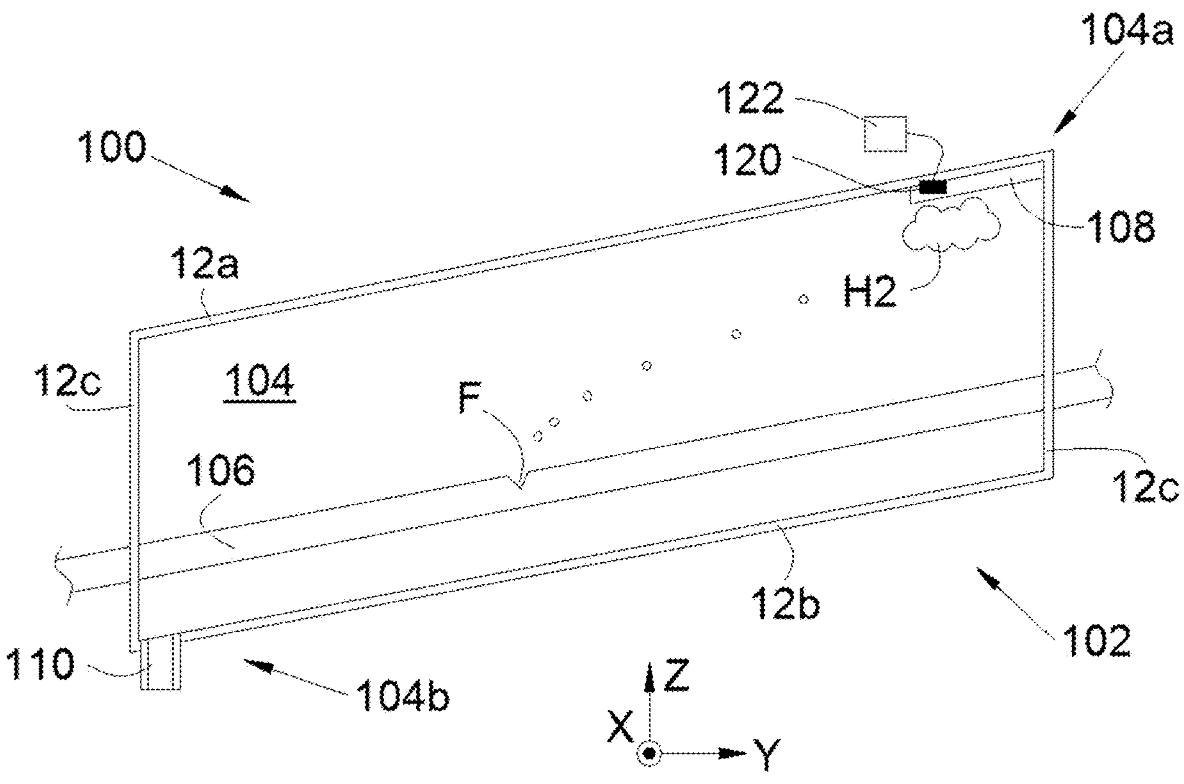
FIG. 2 is a view in cross section of an installation according to a first embodiment of the invention.
Figure 3:
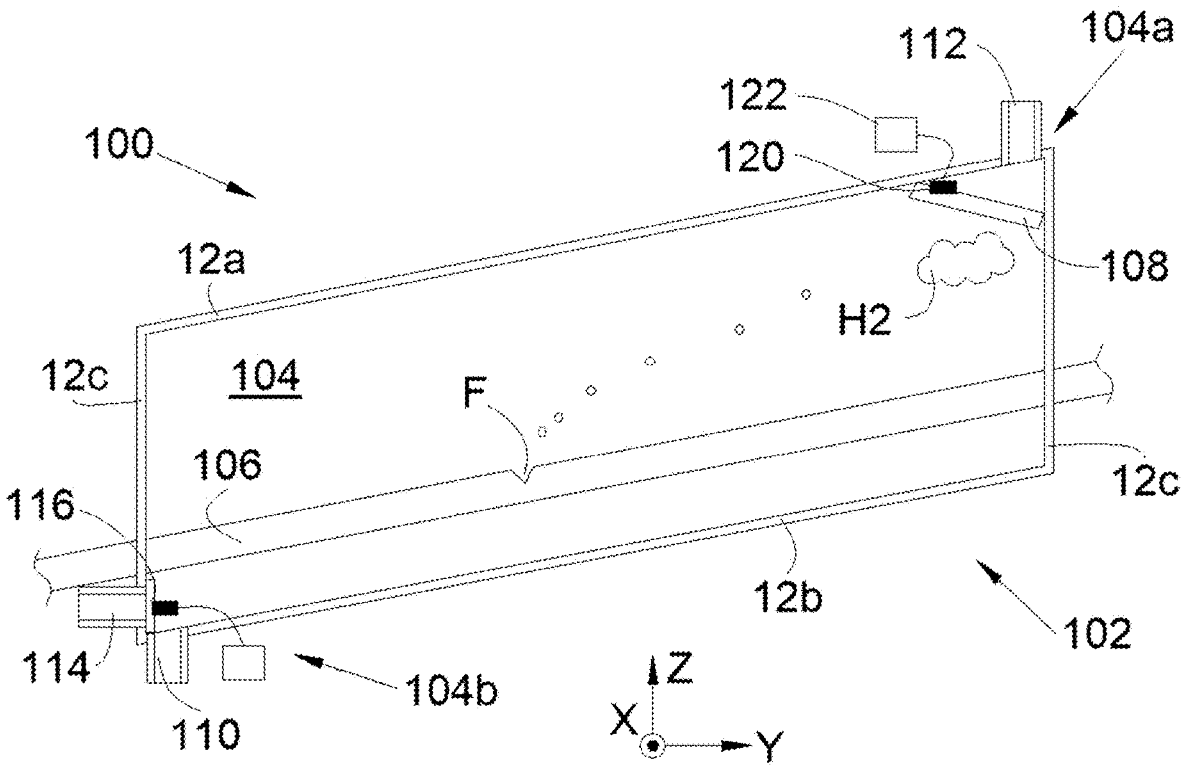
FIG. 3 is a view in cross section of an installation according to a second embodiment of the invention.

Of course, any other part of the aircraft 10 of which elements of the structure delimit a volume also constitutes a structural assembly within the meaning of the invention. FIG. 2 shows an installation 100 according to a first embodiment of the invention and FIG. 3 shows an installation 100 according to a second embodiment of the invention.

The installation 100 has a structural assembly 102. Although this embodiment is based on a structural assembly 102 issuing from the wing 12, the invention applies in the same way to any other structural assembly. The aircraft 10 may have a plurality of installations 100 distributed at various locations.

The installation 100 also has a container 106 that is arranged in the volume 104, as specified above, the container 106 can be any element or set of elements containing dihydrogen.

The volume 104 has a high point 104*a* at which dihydrogen H2 is likely to accumulate in the event of a leak F at the container 106.

In order to limit the concentration of dihydrogen at the high point 104*a*, the installation 100 has a catalyzer 108 that is intended to catalyze an oxidation reaction of the dihydrogen with the ambient air. The dihydrogen is thus oxidized to form water.

In order to transform as much dihydrogen as possible, the catalyzer 108 is fastened in the volume 104 at the high point 104*a*. The position of the catalyzer 108 at the high point 104*a* is such that the accumulated dihydrogen H2 necessarily comes into contact with the catalyzer 108. In the first embodiment of the invention, the catalyzer 108 is against the suction-side wall 12*a*, and in the second embodiment of the invention, the catalyzer 108 is against the suction-side wall 12*a* and one of the crossmember walls 12*c*.

The catalyzer 108 is, for example, constituted of a support, such as a grille, a plate, etc. covered with a suitable catalytic substance such as alumina and/or cerium oxide and/or a platinoid (platinum, palladium, platinum dioxide).

According to the configuration of the structural assembly 102, the consumption of dihydrogen and dioxygen will lead to a drop in pressure in the volume 104 if the latter is hermetic, but the dioxygen will be replaced if the volume 104 is not hermetic. However, in all cases, the consumption of the dihydrogen will decrease the proportion thereof in the volume 104.

In order to evacuate the water thus formed, a drying-out channel 110 can be arranged at a low point 104*b* of the volume 104. The drying-out channel 110 thus passes through a wall of the structural assembly 102, in this case the pressure-side wall 12*b*, and ensures the evacuation of the liquid water from the volume 104.

In order to promote the passage of the dihydrogen H2 through the catalyzer 108, and thus improve the efficiency of the conversion of the dihydrogen, the installation 100 has, through a wall of the structural assembly 102, an evacuation channel 112 that is arranged at the high point 104*a* and behind the catalyzer 108 with respect to the container 106.

The passage through the catalyzer 108 is promoted when the latter is gas-permeable and takes the form, for example, of a grille on which the catalytic substance is deposited.

The evacuation channel 112 in this case passes through the suction-side wall 12*a* but it could also pass through the crossmember wall 12*c*.

In addition, in order to improve the arrival of dioxygen in the volume 104 when the latter is excessively fluidtight, the installation 100 has, through a wall of the structural assembly 102, an introduction channel 114 that makes it possible to introduce air into the volume 104.

The introduction channel 114 passes through the crossmember wall 12*c*, but it can pass through any other wall as long as the air can arrive there. In the same way, the introduction channel 114 is in this case at the low point 104*b*, but it can be at another location.

The various variants described in the context of the second embodiment apply in the same way to the first embodiment.

As a result of the movements of the aircraft 10 during a flight, and of the differences in pressure between the volume 104 and the outside of the structural assembly 102, air and/or dihydrogen can be caused to leave the volume 104 via the introduction channel 114.

In order for the dihydrogen leaving the volume 104 via the introduction channel 114 to also be transformed, the installation 100 has an additional catalyzer 116 intended to catalyze an oxidation reaction of the dihydrogen with the ambient air. This additional catalyzer 116 is then fastened in the volume 104 between the introduction channel 114 and the container 106.

The additional catalyzer 116 can take the same form and the same composition as the catalyzer 108.

Figure 4:
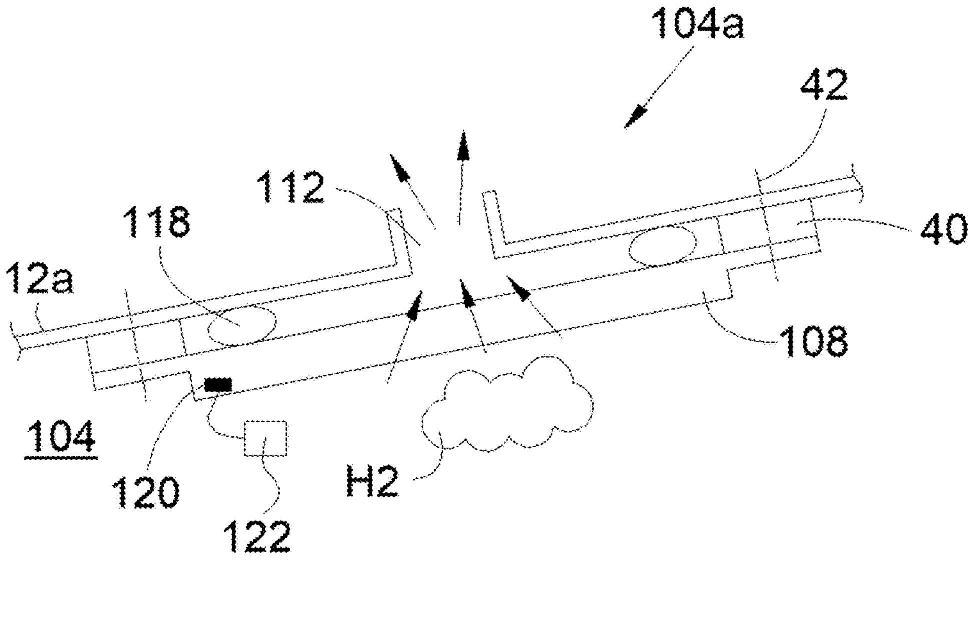
FIG. 4 is a detail view of one placement of a catalyzer.
Figure 5:
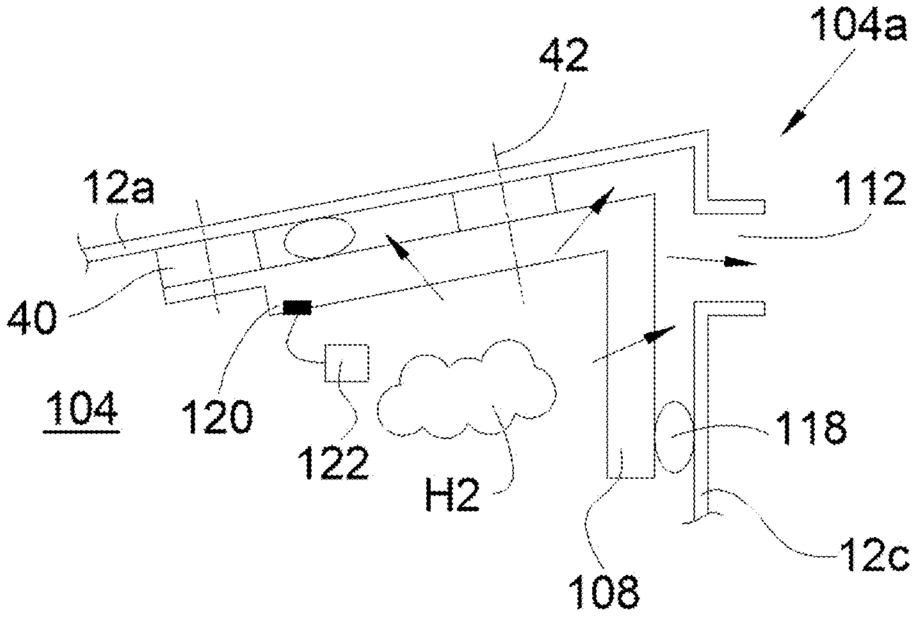
FIG. 5 is a detail view of another placement of a catalyzer.

FIGS. 4 and 5 show two examples of the placement of a catalyzer 108. In the example in FIG. 4, the catalyzer 108 is put in place at a wall, for example in this case at the suction-side wall 12*a*. In the example in FIG. 5, the catalyzer 108 is put in place at a corner between two walls, for example in this case between the suction-side wall 12*a* and the crossmember wall 12*c*.

In each placement, the catalyzer 108 is fastened to one or more walls 12*a*, 12*c* and distanced from these walls 12*a*, 12*c* by way of spacers 40. The fastening is completed in this case by holding screws 42 but any other fastening device is possible.

In order to force the dihydrogen to pass through the gas-permeable catalyzer 108 and reach the evacuation channel 112, the installation 100 has a seal 118, for example an O-ring seal, which is disposed around the evacuation channel 112. This seal 118 is disposed between the catalyzer 108 and the suction-side wall 12*a* in the case in FIG. 4 and the suction-side wall 12*a* and crossmember wall 12*c* in the case in FIG. 5, i.e., the walls of the structural assembly 102 where the evacuation channel 112 is arranged.

Although in the examples in FIGS. 4 and 5 it is the catalyzer 108 that is presented, they apply in the same way to the additional catalyzer 116 and to the associated introduction channel 114.

The temperature of the catalyzer 108, 116 is a function, inter alia, of the quantity of dihydrogen that has been oxidized because this oxidation reaction is exothermic. Thus, by monitoring the temperature of each catalyzer 108, 116 of the aircraft 10, it is possible to assume that dihydrogen is present or absent at each catalyzer 108, 116.

To this end, the installation 100 has, for each catalyzer 108, 116, a temperature sensor 120, for example a thermocouple, which is mounted, for example, against the catalyzer 108, 116 and which measures the temperature of said catalyzer 108, 116.

This information is then transmitted to a control unit 122 which, as a function of the information received and by comparing it to a reference temperature interval, can deduce that dihydrogen is present or absent at each catalyzer 108, 116. On that basis, it can inform the personnel of a possible dihydrogen leak F in the aircraft 10.

The control unit 122 constitutes a hardware platform that has, connected by a communication bus: a processor or CPU (central processing unit); a random-access memory (RAM); a read-only memory, for example of the ROM (read-only memory) or EEPROM (electrically erasable programmable ROM) type; a storage unit, such as a hard disk drive (HDD) or a storage medium reader, such as an SD (secure digital) card reader; and an interface manager in connection with each temperature sensor 120 and an interface for communication with the personnel.

The processor is capable of executing instructions loaded into the random-access memory from the read-only memory, from an external memory, from a storage medium (such as an SD card), or from a communication network. When the control unit 122 is powered up, the processor is capable of reading instructions from the random-access memory and executing them. These instructions form a computer program that causes the implementation, by the processor, of all or some of the steps and operations described here.

All or some of the steps and operations described here can thus be implemented in software form by executing a set of instructions using a programmable machine, for example a processor of DSP (digital signal processor) type or a microcontroller, or be implemented in hardware form by a machine or a dedicated electronic component (chip) or a dedicated set of electronic components (chipset), for example an FPGA (field-programmable gate array) or ASIC (application-specific integrated circuit) component. In general, the hardware platform has electronic circuitry adapted and configured to implement the operations and steps described here.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An installation for an aircraft, said installation having:

a structural assembly of an aircraft delimiting a volume with a high point;

a container in which dihydrogen is present and which is arranged in the volume;

a catalyzer configured to catalyze an oxidation reaction of the dihydrogen with ambient air, wherein the catalyzer is fastened in the volume at the high point;

an evacuation channel through a wall of the structural assembly and arranged at the high point behind the catalyzer with respect to the container;

an introduction channel configured to introduce air into the volume; and, an additional catalyzer configured to catalyze an oxidation reaction of the dihydrogen with ambient air, wherein the additional catalyzer is fastened in the volume between the introduction channel and the container.

2. The installation as claimed in claim 1, wherein the volume has a low point and wherein the installation further comprises, at the low point, a drying-out channel arranged through a wall of the structural assembly and configured to evacuate liquid water from the volume.

3. The installation as claimed in claim 1, wherein, for each catalyzer, the installation further comprises a seal disposed around an associated channel, between the catalyzer and the wall of the structural assembly where said associated channel is arranged.

4. The installation as claimed in claim 1, wherein the structural assembly comprises a portion of a wing of the aircraft.

5. The installation as claimed in claim 1, wherein each catalyzer comprises a temperature sensor configured to measure a temperature of said catalyzer.

6. An aircraft comprising:

at least one installation as claimed in claim 1.

* * * * *